United States Patent
Turner et al.

(10) Patent No.: US 11,645,101 B2
(45) Date of Patent: May 9, 2023

(54) PROVIDING TRUSTED VIRTUAL SECURE CRYPTOPROCESSORS FOR GUESTS

(71) Applicant: Assured Information Security, Inc., Rome, NY (US)

(72) Inventors: Richard Turner, Verona, NY (US); Joel Upham, Paris, NY (US)

(73) Assignee: ASSURED INFORMATION SECURITY, INC., Rome, NY (US)

(*) Notice: Subject to any disclaimer, the term of this patent is extended or adjusted under 35 U.S.C. 154(b) by 545 days.

(21) Appl. No.: 16/835,875

(22) Filed: Mar. 31, 2020

(65) Prior Publication Data

US 2023/0115278 A1     Apr. 13, 2023

(51) Int. Cl.
| | |
|---|---|
| *G06F 9/455* | (2018.01) |
| *G06F 21/53* | (2013.01) |
| *G06F 21/57* | (2013.01) |
| *G06F 21/78* | (2013.01) |
| *G06F 21/62* | (2013.01) |

(52) U.S. Cl.
CPC .......... *G06F 9/45558* (2013.01); *G06F 21/53* (2013.01); *G06F 21/575* (2013.01); *G06F 21/6209* (2013.01); *G06F 21/78* (2013.01); *G06F 2009/45587* (2013.01); *G06F 2221/034* (2013.01)

(58) Field of Classification Search
CPC .... G06F 9/45558; G06F 21/53; G06F 21/575; G06F 21/6209; G06F 21/78; G06F 2009/45587; G06F 2221/034; G06F 9/455; G06F 11/14; G06F 11/0712; G06F 11/1484; H04L 29/06
See application file for complete search history.

(56) References Cited

U.S. PATENT DOCUMENTS

| | | | |
|---|---|---|---|
| 9,280,289 B1 * | 3/2016 | Ramdass | G06F 3/061 |
| 10,282,092 B1 * | 5/2019 | Jain | G06F 3/0664 |
| 2008/0077993 A1 | 3/2008 | Zimmer et al. | |

(Continued)

OTHER PUBLICATIONS

D. Safford, S. Berger. "SWTPM—Software TPM Emulator." Github. 2019. Retrieved on Nov. 25, 2019 from the Internet URL: <https://github.com/stefanberger/swtpm>, 1 pg.

(Continued)

*Primary Examiner* — Daniel B Potratz
*Assistant Examiner* — Arif Khan
(74) *Attorney, Agent, or Firm* — Matthew M. Hulihan; Heslin Rothenberg Farley & Mesiti PC (57) ABSTRACT

Provision of a virtual secure cryptoprocessor (VSC) for a guest virtual machine (VM), part of a first guest, of a hypervisor of a computer system, includes (i) storing guest VM state and VSC state together in an encrypted virtual hard disk drive file, (ii) storing a decryption key in a sealed partition, of a second guest, sealed against a physical secure cryptoprocessor, (iii) based on verifying that a host computing environment of the computer system is in a trusted state and on booting the hypervisor thereon, unsealing the sealed partition of the second guest, the unsealing providing the decryption key, and decrypting the encrypted virtual hard disk drive file using the decryption key, where the decrypting decrypts the stored guest VM state for execution of the guest VM and decrypts the VSC state to provide the VSC for use by the guest VM.

17 Claims, 6 Drawing Sheets

(56) References Cited

U.S. PATENT DOCUMENTS

| | | | |
|---|---|---|---|
| 2008/0244569 A1* | 10/2008 | Challener | G06F 9/45558 718/1 |
| 2014/0007087 A1 | 1/2014 | Scott-Nash et al. | |
| 2015/0039891 A1 | 2/2015 | Ignatchenko et al. | |
| 2015/0121135 A1 | 4/2015 | Pape | |
| 2016/0105280 A1 | 4/2016 | Kinshumann et al. | |
| 2016/0210457 A1* | 7/2016 | Cleeton | G06F 21/575 |
| 2018/0246749 A1* | 8/2018 | van Riel | G06F 9/5077 |

OTHER PUBLICATIONS

Xen Project. "Xen Project Wiki—Main Page." 2019. Retrieved on Nov. 25, 2019 from the Internet URL: <https://wiki.xenproject.org/wiki/Main_Page>, 2 pgs.

Berger S., et al., "vTPM: Virtualizing the Trusted Platform Module", Proc. 15th Conf. on USENIX Security Symposium. 2006, pp. 305-320.

Trusted Computing Group. "TPM 2.0 Library Specification." Sep. 2016. Retrieved on Nov. 25, 2019 from the Internet URL: <https://trustedcomputinggroup.org/resource/tpm-library-specification/>, 9 pgs.

OpenXT. Retrieved on Nov. 25, 2019 from the Internet URL: <https://openxt.org>, 2 pgs.

C. Clark. "OpenXT Project in 2016." Xen Developer Summit. Aug. 2016. Retrieved on Nov. 25, 2019 from the Internet URL: <https://www.slideshare.net/xen_com_mgr/the-openxt-project-in-2016-christopher-clark-bae-systems>, 12 pgs.

C. Rogers. "Supporting TPM 2.0 In The DRTM on OpenXT." Xen Project Developer and Design Summit. Budapest, Hungary. Jul. 2017. Retrieved on Nov. 25, 2019 from the Internet URL: <https://www.slideshare.net/xen_com_mgr/xpdds17-supporting-tpm-20-in-the-dynamic-root-of-trust-model-on-openxt-chris-rogers-ais>, 7 pgs.

S. Berger, "libtpms." Github. 2019. Retrieved on Nov. 25, 2019 from the Internet URL: <https://github.com/stefanberger/ibtpms>, 2 pgs.

QEMU. Retrieved on Nov. 25, 2019 from the Internet URL: <https://www.qemu.org/>, 3 pgs.

Stub Domain. "Device Model Stub Domains." Jul. 2019. Retrieved on Nov. 25, 2019 from the Internet URL: <https://wiki.xenproject.org/wiki/Device_Model_Stub_Domains>, 3 pgs.

OpenXT. Retrieved on Nov. 25, 2019 from the Internet URL: <https://openxt.atlassian.net/wiki/spacedirectory/view.action>, 1 pg.

Aiash, et al., "Secure live virtual machines migration: issues and solutions" 2014 28th 1-20 International Conference an Advanced Information Networking and Applications Workshops, May 16, 2014, 8 pgs.

International Search Report and Written Opinion for PCT/US2020/64985 completed Mar. 10, 2020, 24 pgs.

* cited by examiner

PROVIDING TRUSTED VIRTUAL SECURE CRYPTOPROCESSORS FOR GUESTS

STATEMENT REGARDING FEDERALLY SPONSORED RESEARCH OR DEVELOPMENT

This invention was made with government support under contract FA8750-18-F-0001 awarded by the Air Force Research Laboratory of the United States Air Force. The government has certain rights in the invention.

BACKGROUND

The utility of virtual machines (VMs) has been well known for decades. Today, it is advantageous for individual software developers to use virtual machines because they can easily save and replicate the exact state of the virtualized system. In the event that an error occurs, most tools allow VMs to revert to a previous snapshot. Additionally, developers can easily perform compatibility tests on a wide array of emulated hardware, and malware is often unable to escape from within a virtual machine. In a corporate environment, VMs can reduce company hardware costs by giving multiple employees shared access to hardware resources. Each employee can work on a logically, but not physically, distinct machine. Sharing hardware resources can also ensure greater processor (e.g. central processing unit—CPU) utilization, while the use of differencing disk storage reduces memory consumption. As a result, running multiple VMs from the same hardware can improve both energy and memory efficiency.

Although use of virtual machines comes with numerous benefits, there are also inherent security risks. A large virtual network with many VMs performs some form of scheduling to split CPU and memory utilization as fairly as possible between VMs. This incentivizes a "greedy" VM to exploit weaknesses in the host's scheduling policy to increase its own computing power at the expense of other VMs, effectively monopolizing access to the CPU. Since virtual machines can contain sensitive personal or other information, ensuring isolation between domains can be important. Such isolation can be made difficult by the fact that a malicious virtual machine may share hardware with many other virtual machines, making side-channel attacks a realistic possibility. By measuring variations in timing or power consumption, errant processes could leak sensitive information about the state or memory contents of another resident VM. A malicious actor could also infect the host domain itself with nefarious code, which compromises the security of all of the host's local virtual machines.

SUMMARY

Shortcomings of the prior art are overcome and additional advantages are provided via a computer implemented method. The method includes providing a virtual secure cryptoprocessor for a guest virtual machine of a hypervisor of a computer system. The guest virtual machine is part of a first guest of the hypervisor, and the providing the virtual secure cryptoprocessor includes storing guest virtual machine state and virtual secure cryptoprocessor state together in an encrypted virtual hard disk drive file, storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state, based on verifying that the host computing environment is in the trusted state and on booting the hypervisor on the host computing environment, unsealing the sealed partition of the second guest, the unsealing providing the decryption key, and decrypting the encrypted virtual hard disk drive file using the decryption key, where the decrypting decrypts the stored guest virtual machine state for execution of the guest virtual machine and decrypts the virtual secure cryptoprocessor state to provide the virtual secure cryptoprocessor for use by the guest virtual machine.

Further, a computer program product is provided that includes a computer readable storage medium storing instructions for execution to perform a method. The method includes providing a virtual secure cryptoprocessor for a guest virtual machine of a hypervisor of a computer system. The guest virtual machine is part of a first guest of the hypervisor, and the providing the virtual secure cryptoprocessor includes storing guest virtual machine state and virtual secure cryptoprocessor state together in an encrypted virtual hard disk drive file, storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state, based on verifying that the host computing environment is in the trusted state and on booting the hypervisor on the host computing environment, unsealing the sealed partition of the second guest, the unsealing providing the decryption key, and decrypting the encrypted virtual hard disk drive file using the decryption key, where the decrypting decrypts the stored guest virtual machine state for execution of the guest virtual machine and decrypts the virtual secure cryptoprocessor state to provide the virtual secure cryptoprocessor for use by the guest virtual machine.

Yet further, a computer system is provided that is configured to perform a method. The method includes providing a virtual secure cryptoprocessor for a guest virtual machine of a hypervisor of a computer system. The guest virtual machine is part of a first guest of the hypervisor, and the providing the virtual secure cryptoprocessor includes storing guest virtual machine state and virtual secure cryptoprocessor state together in an encrypted virtual hard disk drive file, storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state, based on verifying that the host computing environment is in the trusted state and on booting the hypervisor on the host computing environment, unsealing the sealed partition of the second guest, the unsealing providing the decryption key, and decrypting the encrypted virtual hard disk drive file using the decryption key, where the decrypting decrypts the stored guest virtual machine state for execution of the guest virtual machine and decrypts the virtual secure cryptoprocessor state to provide the virtual secure cryptoprocessor for use by the guest virtual machine.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

One way to address some of the above-noted security risks associated with a virtual machine environment is full-disk encryption, which can reduce the risk of malware reading or modifying a virtual machine's data from the host domain. Hardware-enabled technology for evaluating and verifying trust of a computing platform could additionally or alternatively be used. An example such hardware-enabled technology is a secure cryptographic processor, an example implementation of which is the Trusted Platform Module (TPM), based on a specification defined by the Trusted Computing Group that establishes a set of requirements for a secure cryptoprocessor. TPMs and virtual trusted platform modules (TPMs) can help mitigate the risk of malware reading or modifying a virtual machine's data by ensuring that critical code, such as boot code, for a virtual machine is never altered.

Described herein are approaches for providing virtual secure cryptoprocessor(s) for guest virtual machine(s) of a hypervisor of a computer system. The hypervisor hosts one or more 'guests', which can include guest virtual machine(s). Additionally, the hypervisor can host one or more secure or privileged 'domains'. An example secure cryptoprocessor is a Trusted Platform Module (TPM), and hence an example virtual secure cryptoprocessor is a virtual Trusted Platform Module (vTPM). Though examples and explanation herein present a TPM as the secure cryptoprocessor, this is only for purposes of example and not limitation. Aspects and principles described herein apply to, and can be used with, other forms of secure cryptoprocessor, as will be appreciated by skilled artisans.

In example approaches, a chain of trust is extended from a single physical TPM to multiple virtual TPMs in a hypervisor environment. This is accomplished by storing each VM with its associated vTPM in a single virtual hard disk drive file that is secured with full-disk encryption. The partition containing the decryption keys for decrypting the VMs can be 'sealed', thus ensuring that each vTPM is accessible only after the physical TPM has verified that the system is in a trustworthy state. In a specific example in which the hypervisor is the OpenXT hypervisor (developed by openxt.org), the "Measured Launch" capabilities provided by the OpenXT hypervisor can be used to seal the partition. Sealing the partition extends the chain of trust from the physical TPM to all vTPMs and provides virtual machines the same security guarantees as provided by a physical machine. Thus, aspects can provide a respective vTPM to each virtualized guest utilizing, e.g., the Trusted Platform Base (TCB) of OpenXT.

Each guest can be provided the same usage model for using the vTPM as that of a physical TPM. Meanwhile, there is a strong association between a guest VM and the vTPM for that guest, allowing for migration of the guest VM disk/state across physical boundaries, as well as between the vTPM and the TCB. This is accomplished without impeding the use of the hardware/physical TPM of the computer system.

vTPMs are provided hereby to guests without the need for complicated TPM managers, platform configuration register (PCR) management with a hardware TPM, and front/back drivers. TCB facilities can bind encrypted disks to the hardware TPM, accomplished by storing the encryption keys for the virtual disk drive files within a separate partition, for instance a /config partition, as one example. This partition may be unlocked only when the system is verified to be in a trusted state. Additionally, embodiments may enable management of virtualized disks from a 'stubdomain', an isolated domain that runs a hardware emulator, such as the QEMU (available at qemu.org) system hardware emulator. There are tools for QEMU, such as swtpm and libtpms, that can provide virtualized TPM instances to a guest as described herein.

Figure 1:
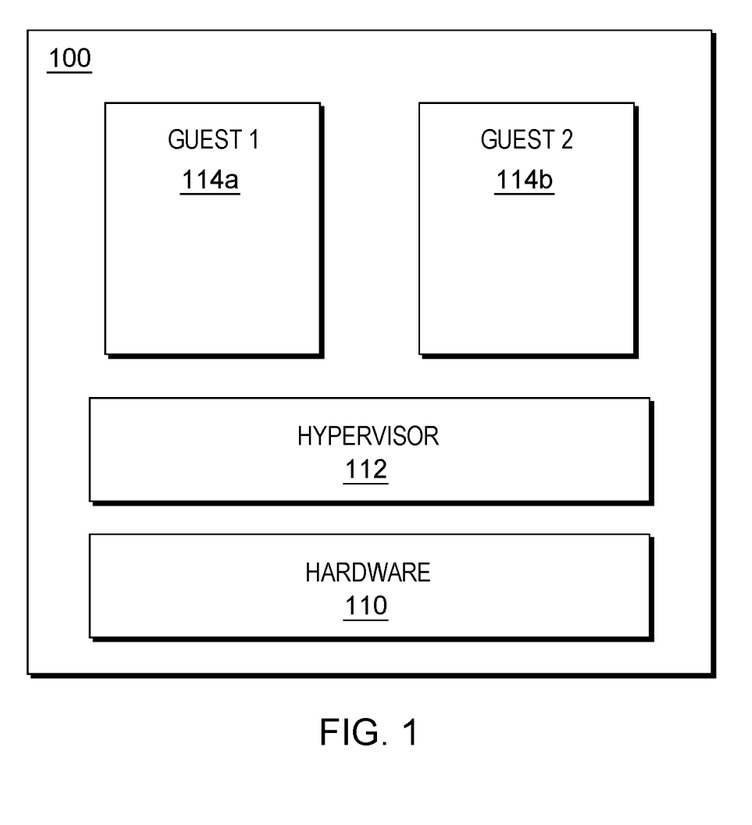
FIG. 1 depicts an example computer system running a hypervisor and guests.

For context, FIG. 1 depicts an example computer system running a hypervisor and guests. In FIG. 1, computer system 100 is shown having hardware 110, which includes the hardware resources of the system, such as processor(s), main memory, I/O devices, etc. Hypervisor 112 sits (conceptually) above hardware 110 in that the hypervisor 112 executes thereon and virtualizes the underlying hardware resources to provide virtualized environment(s) for guests. In some embodiments, hypervisor 112 uses hardware-assisted virtualization available through extensions supported by the physical processor(s). These extensions are termed "processor extensions" or "VM extensions". Intel Corporation's VT-x and Advanced Micro Devices' AMD-V® are well-known examples of VM extensions through which hypervisor 112 may be provided (AMD-V is a trademark of Advanced Micro Devices, Inc., Sunnyvale, Calif.). In this example, hypervisor 212 'hosts' two guest systems, 114a and 114b, which may be virtual machines executing one or more operating systems and other computer programs, as examples.

FIG. 1 depicts a "type-1" hypervisor, which executes directly on the "bare-metal" system hardware 110. Type-1 hypervisors are also referred to as "native" hypervisors. Well-known example type-1 hypervisors are the Xen hypervisor (maintained by the Xen Project of The Linux Foundation), Oracle VM (offered by Oracle Corporation, Redwood City, Calif., U.S.A.), and the Hyper-V hypervisor (offered by Microsoft Corporation, Redmond, Wash., U.S.A., of which Hyper-V is a trademark). Type-1 is contrasted with "type-2" hypervisors in which an operating system executes on top of the hardware and provides virtualization services to a hypervisor program that executes on top of the 'host' operating system. Type-2 hypervisors are also referred to as hosted hypervisors. Example type-2 hypervisors include VirtualPC (offered by Microsoft Corporation) and Oracle VM VirtualBox® (offered by Oracle Corporation, of which VIRTUALBOX is a trademark).

Software-emulated TPMs have been available and multiple hypervisor projects have incorporated these as an optional feature to increase security. The Xen Project and QEMU are two such projects. QEMU is an open-source type-2 hypervisor capable of full-system emulation for supported architectures. QEMU also provides vTPM support. However, although QEMU has support for vTPMs, it fails to provide a full infrastructure for guaranteeing that the virtual machine will be in a trusted state upon booting because QEMU is a type-2 hypervisor.

Xen, as noted, is a type-1 hypervisor and is one of the most common type-1 hypervisors in use today. Several other hypervisor projects, including OpenXT, started as forks of the mainstream Xen repository. Xen has limited vTPM support and a relatively complex vTPM management scheme. Although Xen does support TPM 2.0 using TPM passthrough for its fully-privileged 'Domain 0 (Dom0), only TPM 1.2 is available for virtual guests. Furthermore, in order to use TPM 1.2, each guest must have a custom loadable kernel module (LKM) installed. Thus, Xen fails to provide vTPM support for Windows® guests. Additionally, TPM emulation in Xen is only possible for paravirtualized guests. Despite these shortcomings, Xen has implemented a chain of trust that extends from each virtual machine back to the physical TPM using an existing approach. This design enables multiple virtual machines to have their own vTPMs. However, in the backend, all VMs share usage of a single hardware TPM. A single vTPM manager stubdomain regulates access to the physical TPM and works in concert with vTPM stubdomains (one for each VM) to record and modify the state of each VM's vTPM.

Aspects described herein can extend the chain of trust from a hypervisor's TCB to virtual TPMs using a process that does not require a vTPM manager per se. As a result, the approach may be much more workable than previous designs and therefore less prone to implementation errors, which could have dire security consequences. In some embodiments, full vTPM emulation may be used through SWTPM and the hardware TPM is ignored. This can allow a measured launch of the hypervisor's privileged host domain, e.g. Dom0, to use the physical TPM. Each virtual machine may be stored with its associated vTPM on a single encrypted file, for instance a file in Dom0, to prevent tampering and to retain a strong association between the VM and its vTPM. Changes could be made to the hypervisor source code to enable the usage of desired TPM version(s), such as TPM 2.0, with desired operating systems, such as the Windows® line of operating systems offered by Microsoft Corporation.

The original TPM specification, now in version 1.2, has been superseded by TPM 2.0, which offers support for additional cryptographic algorithms, improved authorization mechanisms, and a simpler TPM management protocol. A hardware TPM that follows the TPM specification is capable of random number and cryptographic key generation, and has a small amount of storage for these keys and other data. In particular, its Platform Configuration Registers (PCRs) allow storing hashes of software/hardware state measurements. TPM keys can be used to "bind" or "seal" (encrypt) data so that it cannot be decrypted unless the PCRs verify that the host computing system is in a particular state. PCR measurements can also be used to verify to a foreign host that both system firmware and software has not been modified (a process called "remote attestation"), or to ensure that the code for each stage of a boot sequence has not been modified by a malicious program. TPMs are used for the security guarantees that they provide, as hardware TPMs are often implemented as an isolated tamper-resistant chip and they present a limited software interface. As such, they are an ideal source for secure random number and cryptographic key generation.

This may be leveraged in performing verification of a host computing environment, i.e. to determine whether the system is in a trusted state. If the system is not in a trusted state, then the system is not verified as such. However, if 'verified', further processing can take place. For instance, software, such as a hypervisor could be booted. In accordance with aspects described herein, verification that a host computing system is in a trusted state could prompt an unsealing of a sealed partition of a guest. The unsealing can provide decryption key(s) for decrypting an encrypted virtual hard disk drive (e.g. VHD) file. The encrypted VHD file can store guest VM state and vTPM state in encrypted form, which is decrypted using the unsealed decryption key(s). The decrypting decrypts the VHD file and therefore both the stored guest virtual machine state for execution of a desired guest virtual machine and the virtual secure cryptoprocessor state to provide a virtual secure cryptoprocessor for use by that guest virtual machine.

OpenXT is an open-source project, type-1 hypervisor based on Xen (used as a virtualization platform for both Linux and Windows guests) and built using the OpenEmbedded toolchain (available at openembedded.org). OpenXT is optimized for usage with x86 devices having a TPM and that support Intel® Virtualization Technology for Directed ("Intel VT-d") and Intel® Trusted Execution Technology ("Intel TXT"), offered by Intel Corporation, Santa Clara, Calif., U.S.A. (of which INTEL is a trademark). OpenXT has improved security by using Intel® TXT and tboot for measured launch, a read-only root filesystem, Linux-based stubdomains to encapsulate QEMU instances, SELinux policies in Dom0, and disaggregation and isolation wherever possible.

A "measured launch" can be performed using either a dynamic root of trust for measurement (DRTM) or static root of trust for measurement (SRTM). SRTM runs at boot time and measures the code for each step of the boot process before executing it, storing each result in a PCR. DRTM is more flexible and operates while the system is running to create a trusted environment from what is assumed to be an untrusted state. For maximum security, both methods can be used—The static chain of trust starts when power is first supplied to the hardware, and measures and validates the integrity of the authenticated code module (ACM) provided by the chip manufacturer. Next, it measures the Basic Input/Output System (BIOS) and related components, such as Option ROM code, Option ROM configuration and data, the initial program loader (IPL) code, and the host platform configuration. Control is passed to the dynamic chain of trust, which measures another authenticated code module (the SINIT ACM) before using it to verify that the current configuration is valid and proceed to measure the kernel and initramfs.

To store the results of an entire sequence of measurements in a single PCR register, the PCRs support an operation called "extension" in which the stored hash is recomputed by hashing the concatenation of the existing hash and the new measurement. This allows the PCRs to track and verify the states of as many components as desired. Hashing algorithms used by the TPM are designed such that it is computationally infeasible to intentionally force a hash collision using a different sequence of measurements. Therefore, if the PCR register values match the expected values upon finishing the boot sequence, the system is deemed with high probability to be in the correct and trusted state.

A virtual TPM can be provided by a hypervisor to a guest virtual machine, appearing to the guest VM as if it were a physical TPM. To create a vTPM, most TPM emulators can either fully emulate a TPM device in software or 'pass' the physical TPM device to a virtualized guest. Conventionally in the latter case, the vTPM will be available only to a single guest domain. To avoid TPM ownership problems, in this case it may be desired that the physical TPM not be used by the host. For these reasons, fully emulated TPM devices may be preferred in modern virtual networks. Of currently available software vTPM implementations, a primary obstacle lies not in implementing the same functionality as a physical TPM but in ensuring that they provide the same security guarantees.

In accordance with aspects described herein, the existing chain of trust used in the OpenXT boot sequence (as one example) is extended to link each guest VM's vTPM to the host's TPM in such a manner that guest machines will have access to only their vTPMs when the host has booted securely. Furthermore, each vTPM can be stored in the same VHD file as the image for its associated VM (guest VM state). In this manner, guest virtual machine state and virtual secure cryptoprocessor state may be stored together in a common encrypted virtual hard disk drive file. This can ensure that the guest VM and virtual secure cryptoprocessor states are inextricably linked and can only be migrated together.

In some embodiments, each VM having an associated vTPM is stored in its own respective VHD file. If such a VM hosts one or more other VMs in a nested VM arrangement, then each of the nested VMs can be stored in a separate VHD file of the host VM.

Figure 2:
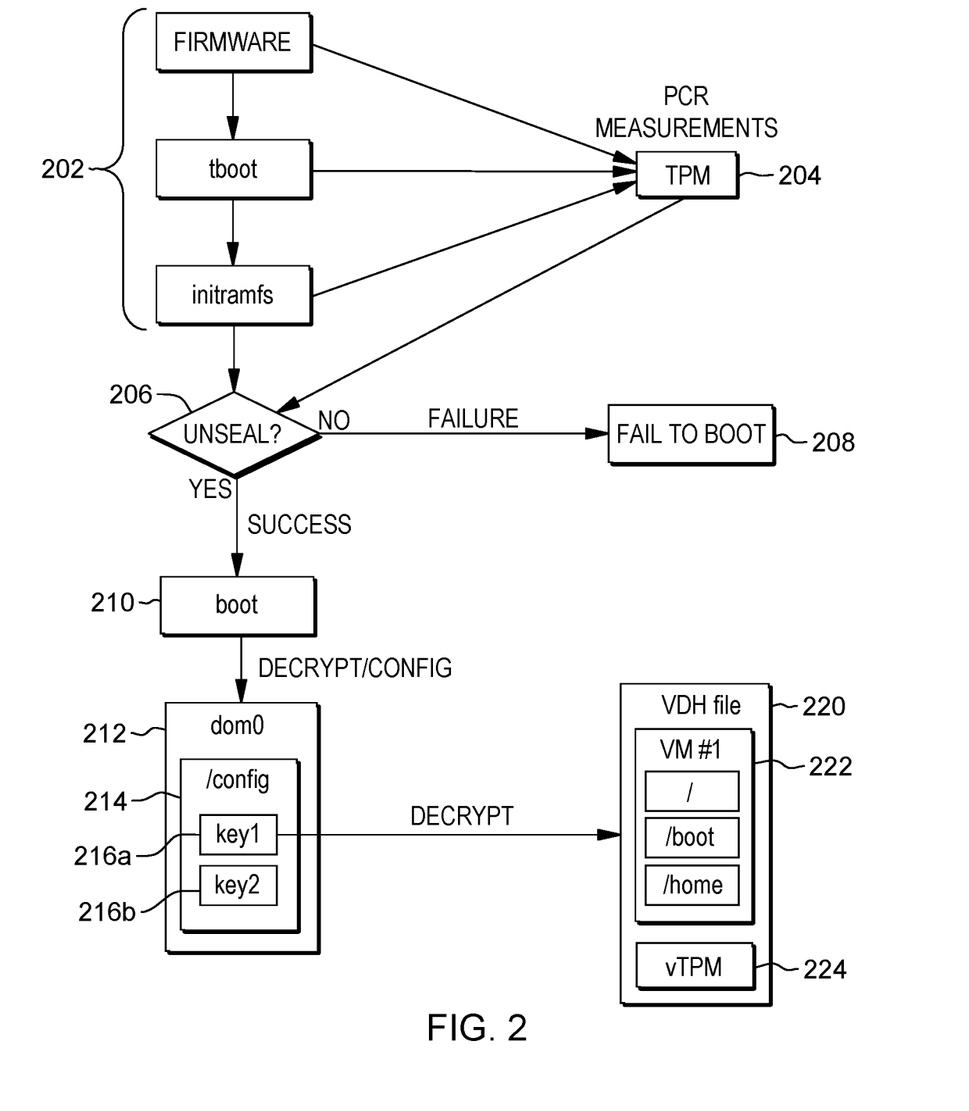
FIG. 2 depicts an example sequence for providing a root of trust for virtual secure cryptoprocessors, in accordance with aspects described herein.

FIG. 2 depicts an example sequence for providing a root of trust for virtual secure cryptoprocessors, in accordance with aspects described herein. A trusted computing base is established via measurements of components 202, here firmware, tboot and initramfs components. During the process, PCR measurements for various components (the firmware, tboot source, and initramfs in this example) are taken and stored on the TPM 204. For instance, during the initial booting and installing of the system, measurements are taken for the computing base components (e.g. firmware, tboot, etc). These measurements are then stored in the TPM for comparison. Once the system is installed and the measurements taken, the TPM is sealed with these measurements. After this, the TPM measurements cannot be changed as they constitute a reflection of a trusted state for the system. When the system is booted after this initial install and sealing, the same computing base components are again measured and these measurements are compared to the sealed state. If the measurements differ, then this indicates that the system has been altered. Typically such comparison is performed by the trusted computing base system rather than the TPM, which is instead typically used as a means to securely store the PCR's and provide other facilities, such as key management. Thus, the PCR measurements can be used to measure the components along the way, making sure that each component is in a valid state. This is typically done in succession—first component A, then component B if component A passes, and so on. Trusted data maintained in the TPM used for measurement comparison is typically sealed into the TPM when the system is initially installed/setup. Measurements of the components are taken at that time, sealed into the TPM, and used for comparison against the later measurement values of those components. If there is a mismatch between the measurement of a component and the sealed measurement for that component, the component is no longer deemed trustworthy and the system is not verified as being in the trusted state. The boot process can halt at that point, or any other desired action taken. If instead upon completion of tboot execution the measurements match the expected values in TPM 204, the system is allowed to boot, as the host computing environment is in the trusted state.

In FIG. 2, the determination 206 determines whether to unseal, e.g. decryption key(s), on the basis of the PCR measurement comparisons. If there is a mismatch, then the unseal fails (206, N), resulting in a failure/refusal to boot 208. At that point the process ends with an error or other desired result. If instead the measurements match the expected values in the TPM, the unseal is successful (206, Y) and the system proceeds to the rest of the boot phase 210. Reaching the boot 210 phase means that the host computing environment is in a trusted state. In some examples, boot 210 very early on boots a hypervisor for hosting guests. An example guest is 'Dom0', an initial guest (referred to as a domain in Xen) started by the hypervisor. Dom0 may be a privileged guest for managing other guest(s)/domain(s) (referred to as DomU).

In FIG. 2, Dom0 212 includes an encrypted partition, /config. The unsealing (206, Y) can unseal from the TPM a key for decrypting this partition. The /config partition itself includes decryption keys 216a and 216b, which are decryption keys for decrypting VHD files. Each key may be the decryption key to decrypt a respective VHD file having guest VM and vTPM state therein. The VHD files may be maintained in encrypted state as part of Dom0 or elsewhere.

In order to ensure that each vTPM has a strong association with a single virtual guest, the state of each vTPM is embedded into the same VHD file that stores the contents/state of a guest VM. To accomplish this, a nested partitioning scheme can be employed. The virtual hard disk drive file (e.g. VHD file 220) includes a first partition and a second partition that is separate and different from the first partition. First and second are used in this context to denote different partitions, and does not imply any ordering of the partitions within the VHD file.

The first partition stores the guest virtual machine state including virtual machine data of the guest virtual machine, and the second partition stores the virtual secure cryptoprocessor state including data of the virtual secure cryptoprocessor. Thus, when viewed externally from Dom0, the VHD file appears to have two partitions when mounted. Using VHD file 220 in FIG. 2 by way of example, the first partition 222 contains the entire contents of guest virtual machine #1's hard drive (which may have its own partitioning scheme, this example shows root (/), boot (/boot), and home (/home) directories), and the second partition 224 contains a filesystem storing the vTPM state. This additional partition 224 is not exposed to guest VM1; it remains hidden from the guest and partition 222 during execution of guest VM1, and guest VM1 is unable to view partition 224.

Within the file system of the /config partition 214 of Dom0 resides a directory (e.g. "platform-crypto-keys") that stores the cryptographic keys associated with encrypted VM(s) resident on the platform. More specifically, each key decrypts a respective VHD file in which VM state is stored. These keys, and thus the associated VMs, are accessible only if the /config partition is decrypted, which occurs only as a result of securely booting the host computing environment.

In this manner, an aspect of embodiments described herein store a decryption key in a sealed partition (e.g. /config) of a guest (e.g. Dom0) of the hypervisor. The sealed partition is sealed against a physical secure cryptoprocessor (e.g. the physical TPM) of the computer system, in which unsealing of the sealed partition and the decryption key thereof is based on verifying, using the physical secure cryptoprocessor, that the host computing environment of the computer system is in a trusted state. An example process therefore initially performs verification of the host computing environment, i.e. to verify whether the host is in a trusted state. If so, the hypervisor can be booted, if it was not already booted. Based on verifying that the host computing environment is in the trusted state and on booting the hypervisor on the host computing environment, the process unseals the sealed partition. This unsealing provides one or more decryption keys. From there, the process can decrypt an encrypted virtual hard disk drive file using the appropriate unsealed decryption key. This decrypts the stored guest virtual machine state for execution of that guest virtual machine and also decrypts the virtual secure cryptoprocessor state to provide the virtual secure cryptoprocessor for use by that guest virtual machine.

The binary data of the vTPM can include a number of objects used by the guest and written-to when the guest is booted. The vTPM can be used for whatever purpose desired, for instance to secure code, perform measurements on boot of the guest VM, and provide assurance that the gust VM itself provides a trusted computing base, as examples. The vTPM enables guests to trust their own operating system measurements on boot, for instance. The result is a trusted platform that is running as a guest.

The virtual secure cryptoprocessor (vTPM) is therefore available for use by an operating system of the guest virtual machine on boot of the guest virtual machine to provide assurance that the host computing environment and first guest are in trusted states (verifiable/measured correctly) for guest operating system execution. To the guest the vTPM could appear and function no different than a physical TPM, with all of the same services and capabilities. One common application of a TPM is operating system-provided full disk encryption (FDE), examples of which include the Bitlocker utility provided on various Windows® operating Systems offered by Microsoft Corporation, and the Linux Unified Key Setup (LUKS) offered in some Linux distributions. FDE for the guest virtual machine could be provided based on the assurance provided by the vTPM. In examples, the key file that has encrypted the internal OS hard drive(s) can be stored in the vTPM. Various technologies are configured to require and leverage a TPM to function properly and securely, and a vTPM provided as described herein can be used as such.

In one approach described in further detail with reference to FIG. 3, when booting a guest virtual machine, the guest VM state partition (e.g. 222) having the VM data can be extracted and mounted as a loopback device, then booted like an ordinary virtual machine image. The current state of the vTPM can be read from the second partition (e.g. 224) by a TPM emulator, such as SWTPM, and then presented to the virtual machine as if it were a physical device. In particular examples, there are two parts to this emulator. The first part is a device model emulator embedded in, e.g. a QEMU stubdomain ("stubdom") and the second part is a 'backend' that performs whatever I/O is to happen with the vTPM partition. In some cases, all interaction with the vTPM partition occurs via the stubdom, an isolated domain that runs the device model, i.e. QEMU, separate from Dom0. A stubdom in this context is an isolation domain that protects Dom0 from any guest activity that might occur. The stubdom can be thought of as a very slimmed-down VM.

Figure 3:
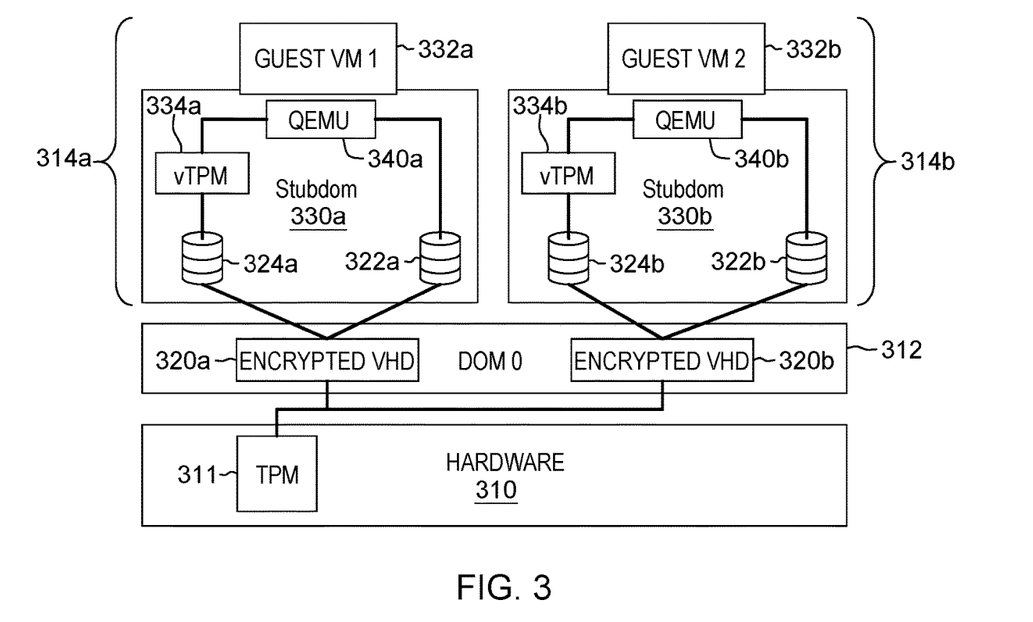
FIG. 3 depicts an example computing environment for providing a virtual secure cryptoprocessor for a guest virtual machine via an emulator, in accordance with aspects described herein.

FIG. 3 depicts an example computing environment for providing a virtual secure cryptoprocessor for a guest virtual machine via an emulator, in accordance with aspects described herein. This particular example may be used in a Xen-based hypervisor environment, as an example. Hardware 310 includes physical TPM 311. Above hardware 310 executes privileged domain Dom0 (no hypervisor is depicted in FIG. 3), which includes encrypted VHDs 320a and 320b corresponding to first and second guests 314a, 314b. Encrypted VHD includes partitions 322a (with guest VM1 state) and 324a (with vTPM state), and encrypted VHD includes partitions 322b (with guest VM2 state) and 324b (with vTPM state). When guest 314a or 314b boots, a respective stubdom 330a or 330b is booted. From there, the process starts a respective guest VM 332a, 332b in a separate domain. In FIG. 3, the guest VM runs above the stubdom, which runs above Dom0. An idea in this embodiment is that the stubdom provides a layer of protection between the guest VM and Dom0. Dom0 is the privileged domain and has direct access to the hardware that is sitting at the hypervisor level. Every other domain may be unprivileged unless given access to specific hardware. In this arrangement, the guest virtual machine 332a, 332b reads its respective virtual secure cryptoprocessor 334a, 334b from the respective vTPM partition 324a, 324b via a secure cryptoprocessor emulator (340a, 340b) that presents the virtual secure cryptoprocessor to the guest virtual machine as a physical device.

Since both partitions for a guest—the partition storing the VM state and the partition storing vTPM state—are wrapped in a single virtual disk drive file, this provides portability of the guests. The guest can be booted securely on any desired computing based (e.g. computer system) as long as the computing base is verified as being trusted.

In embodiments, aspects are implemented on the OpenXT hypervisor. An incremental approach incorporated a functional vTPM into QEMU and then Xen before working with OpenXT. The process proceded with development and automation of the operation of a VHD partitioning scheme which allowed the vTPM and VM state to be stored in the same file and then separated and used correctly from Dom0 upon launching the VM.

Xen and OpenXT use QEMU internally to emulate all peripheral devices (including a TPM) during full-virtualization mode. For TPM emulation, libtpms and SWTPM with TPM 2.0 support enabled are leveraged. Since QEMU already has integrated support for a software TPM emulator, the SWTPM backend can be passed to the virtual machine over a socket interface using additional command line arguments. In some embodiments, both TPM 1.2 and 2.0 work correctly for both Linux and Windows guests with no modifications to QEMU.

Although recent versions of Xen have support for vTPMs, it involves a complex management system that supports only Linux guests. Xen's current system requires that each Linux guest be built with a custom loadable kernel module, allowing it to interface with a vTPM stubdomain whose use of the hardware TPM is managed by another intermediary stubdomain. In accordance with aspects described herein, a SWTPM emulator can be used as the vTPM backend.

In aspects described herein, vTPM state is stored in a virtual hard drive file, for instance a VHD file. An example approach for providing this is as follows: the vhd-util is used to create an empty VHD file, which can be protected with full disk encryption. Next, a block device is created using tap-ctl, which is part of the blktap ("block tap") utility/toolkit of Xen. Block tap is a backend driver and access library that interacts the VHD file. The losetup command is used to create a loopback device, which allows access (reading, writing) to individual partitions on the block device. The fdisk and mkfs commands can then be used to create two partitions on the loopback device—the first being for the VM image and the second being a small filesystem to store the vTPM's state. A VM can be created using xec-vm, with its backend storage set to be the first partition of the loopback device. The desired operating system of the VM can then be installed. The second partition of the loopback device can be mounted and set to be the TPM state directory for SWTPM. In this manner, the vTPM and VM state are stored in the same file and later 'split' up by Dom0 for use with OpenXT's virtual machine launcher or SWTPM, respectively. The states are 'split', despite being stored together, in the sense that the two states are selectively made accessible to different components.

When the guest VM is booted, inquiries you can be made to the vTPM working with the virtual software driver for the TPM during the life of the virtual machine. The backend vTPM state data is read from/written to that vTPM partition created as part of the VHD. As described, that interaction with the vTPM partition is facilitated by the TPM emulator (swtpm) in these examples. In accordance these aspects, the vTPM is securely stored together on a guest hard drive (VHD) with the guest state, which is encrypted to provide security.

In some embodiments, the VHD file is maintained in an encrypted state, with data that is written to the VHD file—both guest VM state data and vTPM state data—being encrypted on-the-fly. Ongoing changes to the VM as it is executed can be made and saved securely, keeping the security of the VHD file intact.

When a guest boots, it can make sure that this boot is in a trusted state because it can leverage the vTPM provided to it to store the trusted state in the virtual TPM that is now available to the guest. The guest can check its own state to see whether or not it is trusted. As an enhancement, that can be extended and applied to the hypervisor, in which the hypervisor can check the vTPM state on boot to make sure, outside of the guest, the guest is in the trusted/same state that it was when it shut down, as an example.

Thus, in accordance with aspects described herein, the contents of a given VM image and vTPM of the VM are stored in the same encrypted file (e.g. VHD) on a privileged domain (e.g. Dom0). The contents are extracted to boot the VM with a vTPM present. The key for each encrypted VHD file that holds a respective VM and its associated vTPM is stored on a partition (e.g. /config) of Dom0, which is sealed against the state of the hardware TPM upon boot, thus ensuring that the vTPMs will be accessible only if Dom0 boots into a trusted state. This ensures a strong association between each VM and its vTPM, and connects each vTPM to the trusted computing base of, e.g. OpenXT.

Figure 4:
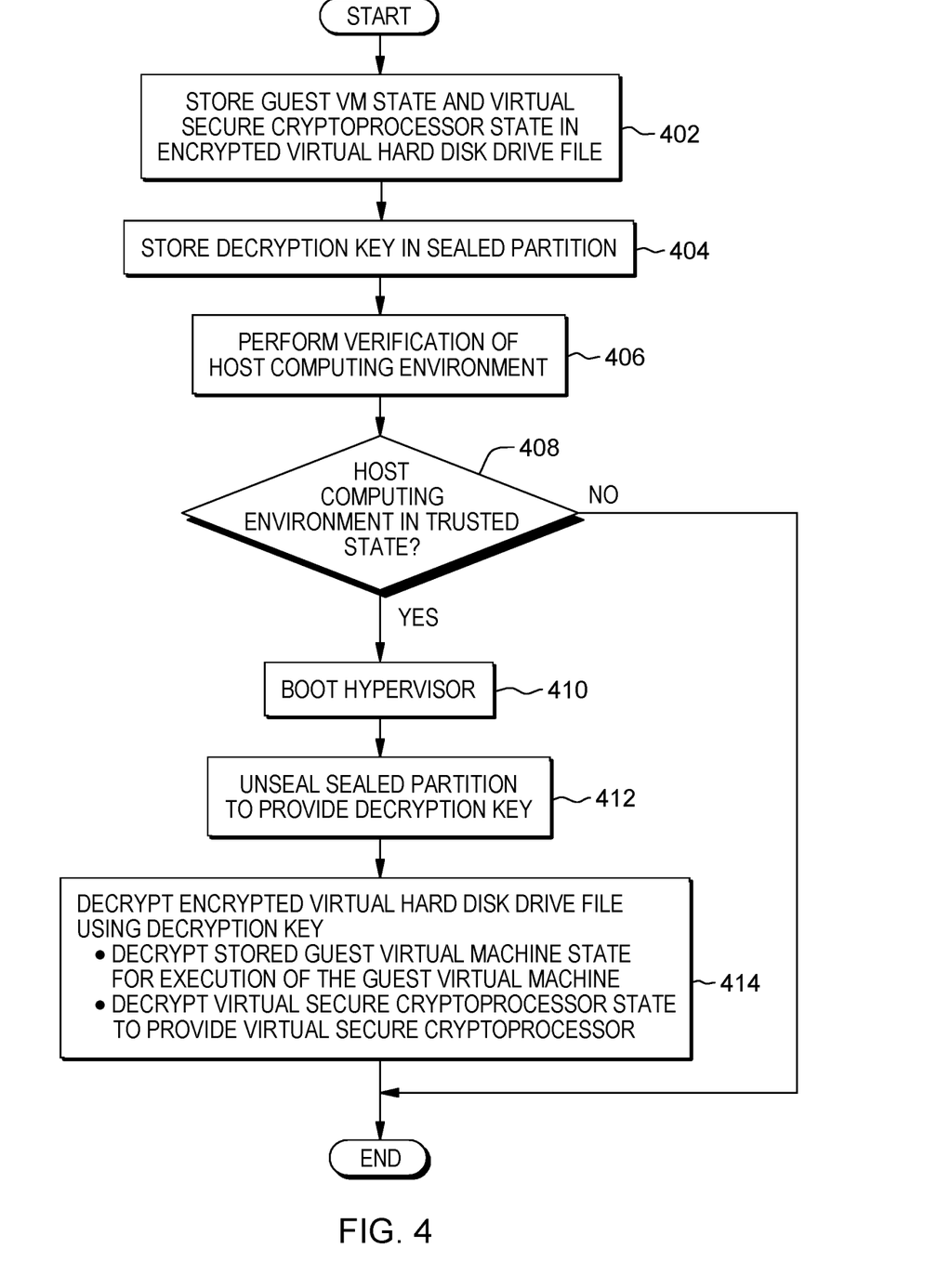
FIG. 4 depicts an example process for providing a virtual secure cryptoprocessor for a guest virtual machine, in accordance with aspects described herein.

FIG. 4 depicts an example of process for providing a virtual secure cryptoprocessor for a guest virtual machine, in accordance with aspects described herein. In some examples, the process is performed by a computer system, such as a computer system as described herein, to provide a virtual secure cryptoprocessor for a guest virtual machine of a hypervisor of the computer system. The guest virtual machine can be part of a first guest of the hypervisor, where the virtual secure cryptoprocessor is to be provided for the first guest. In examples, the virtual secure cryptoprocessor is or includes a virtual trusted platform module (vTPM). The process stores (402) guest virtual machine state and virtual secure cryptoprocessor state together in an encrypted virtual hard disk drive file. An example file format of the virtual hard disk drive file is the VHD file format.

The virtual hard disk drive file includes a first partition and a second partition, with the second partition being separate and different from the first partition. The first partition stores the guest virtual machine state, which can include virtual machine data of the guest virtual machine. The second partition stores the virtual secure cryptoprocessor state including data of the virtual secure cryptoprocessor. The second partition remains hidden from the first partition during execution of the guest virtual machine, in that the guest virtual machine is unable to view the second partition.

The process of FIG. 4 also includes storing (404) a decryption key in a sealed partition of a second guest of the hypervisor. An example such sealed partition of the second guest is a '/config' partition. The sealed partition can be sealed against a physical secure cryptoprocessor (e.g. a TPM) of the computer system. Unsealing of the sealed partition and decryption key(s) thereof (for decrypting virtual hard disk drive files, such as a VHD storing the guest VM and vTPM state) is based on verifying, using the physical secure cryptoprocessor, that a host computing environment of the computer system is in a trusted state. For instance, the sealed partition can be encrypted and unsealing that sealed partition can refer to decrypting that partition (to thereby provide the decryption key(s) for the VHD files). The decryption key for decrypting the sealed partition can be stored in the physical TPM of the system and enabled for use only after verifying the host computing environment. The second guest having the sealed partition can be a privileged domain of the hypervisor. An example such privileged domain is Dom0.

Therefore, the process performs verification (406) of the host computing environment, i.e. to verify whether the host is in a trusted state. A determination (408) is made whether the host computing environment is in the trusted state, and if not (408, N) the process ends. Otherwise (408, Y), the host is in a trusted state and the process boots (410) the hypervisor (if not already booted).

Based on verifying that the host computing environment is in the trusted state (408, Y) and on booting the hypervisor on the host computing environment, the process continues by unsealing (412) the sealed partition of the second guest. The unsealing provides the decryption key. In one example, this involves booting the secure domain and then unsealing the sealed partition thereof.

With the sealed partition unsealed, the process can obtain the proper decryption key(s) and decrypt (414) the encrypted virtual hard disk drive file (or at least portion(s) thereof) using the decryption key. The decrypting decrypts the stored guest virtual machine state for execution of the guest virtual machine and decrypts the virtual secure cryptoprocessor state to provide the virtual secure cryptoprocessor for use by the guest virtual machine.

In some embodiments, the virtual secure cryptoprocessor is available for use by an operating system of the guest virtual machine on boot of the guest virtual machine to provide assurance that the host computing environment and first guest are in trusted states for operating system execution. The operating system of the guest virtual machine can leverage the virtual secure cryptoprocessor for assurance that (i) the host environment is trusted, and (ii) the first guest itself is verifiable/measured correctly, as examples. The guest can interact with the virtual secure cryptoprocessor no differently than if it were a physical secure cryptoprocessor, with the same services and capabilities. As an example, the guest operating system provides full disk encryption for the guest virtual machine based on the assurance provided by the virtual secure cryptoprocessor.

In some embodiments, the guest virtual machine reads the virtual secure cryptoprocessor from the second partition via component, such as a secure cryptoprocessor emulator, that presents the virtual secure cryptoprocessor to the guest virtual machine as a physical device.

Figure 5:
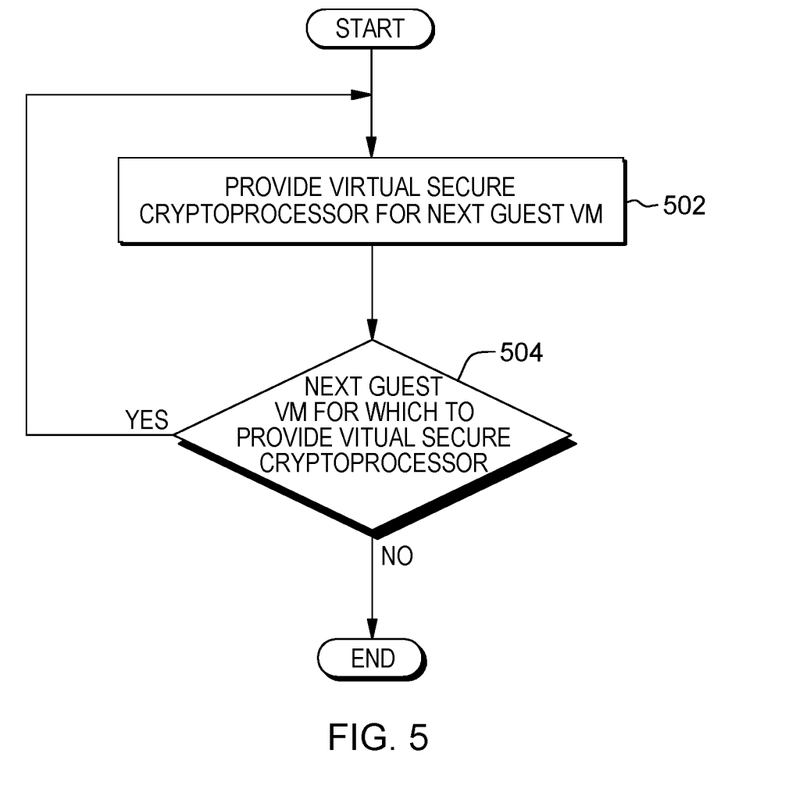
FIG. 5 depicts an example process for providing virtual secure cryptoprocessors concurrently while a computer system executes different guest virtual machines, in accordance with aspects described herein.

FIG. 5 depicts an example process for providing virtual secure cryptoprocessors concurrently while a computer system executes different guest virtual machines, in accordance with aspects described herein. In this example, several different guest virtual machines running above the hypervisor are provided a respective virtual secure cryptoprocessor. The method performs, for each such guest, aspects of FIG. 4, e.g. the providing a virtual secure cryptoprocessor for each guest virtual machine of the hypervisor, where a respective different virtual secure cryptoprocessor is provided to each of the guest virtual machines concurrently while the computer system executes the guest virtual machines. Thus, the process begins and provides (502) a virtual secure cryptoprocessor for a next (e.g. first) guest virtual machine. Provision of the virtual secure cryptoprocessor can be accomplished by the process of FIG. 4. The process of FIG. 5 continues by determining (504) whether there is a next guest virtual machine for which to provide a virtual secure cryptoprocessor. If there is such a next guest (504, Y), the process returns to 502 to provide a virtual secure cryptoprocessor for that next guest. Otherwise (504, N), the process ends.

Although various examples are provided, variations are possible without departing from a spirit of the claimed aspects.

Figure 6:
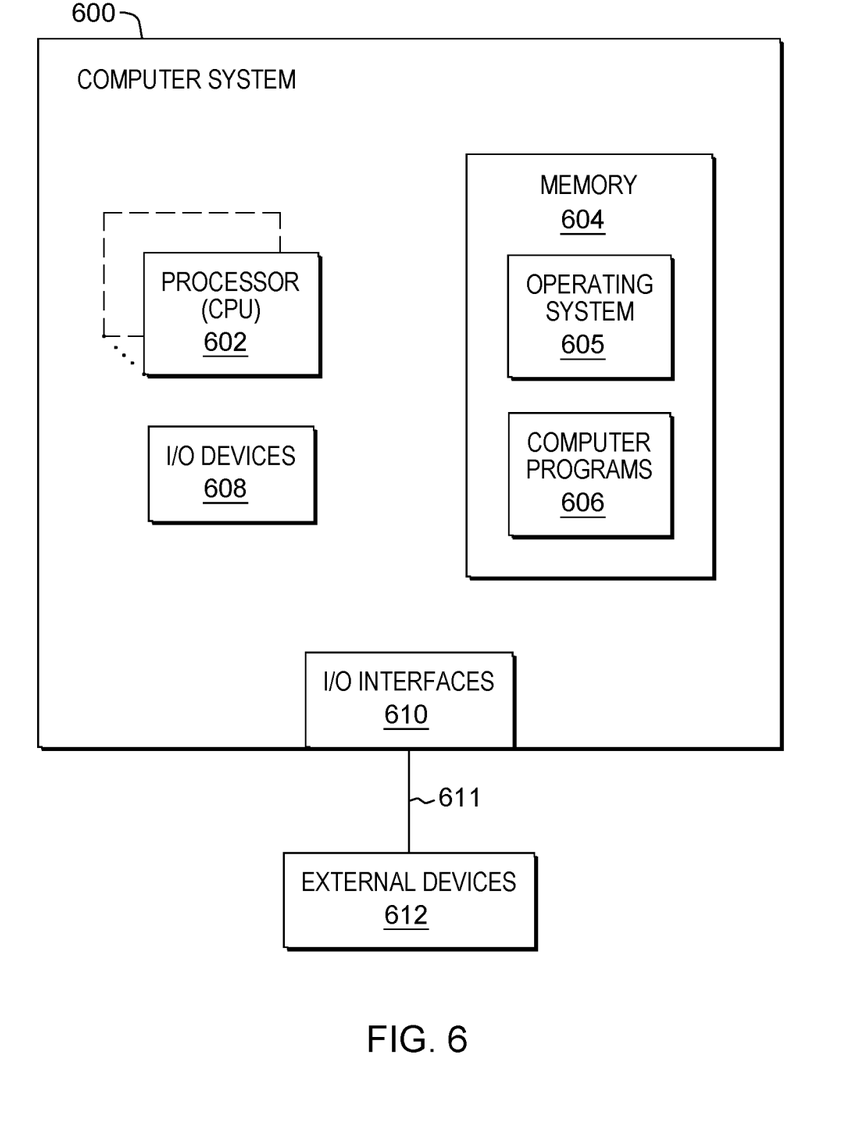
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., U.S.A.) or Advanced Micro Devices (Santa Clara, Calif., USA).

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer implemented method comprising:
providing a virtual secure cryptoprocessor for a guest virtual machine of a hypervisor of a computer system, the guest virtual machine being part of a first guest of the hypervisor, the providing the virtual secure cryptoprocessor comprising:
storing guest virtual machine state and virtual secure cryptoprocessor state together in an encrypted virtual hard disk drive file, wherein the virtual hard disk drive file comprises a first partition and a second partition, the second partition being separate and different from the first partition, wherein the first partition stores the guest virtual machine state including the virtual machine data of the guest virtual machine, and the second partition stores the virtual secure cryptoprocessor state including data of the virtual secure cryptoprocessor;
storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state;
based on verifying that the host computing environment is in the trusted state and on booting the hypervisor on the host computing environment, unsealing the sealed partition of the second guest, the unsealing providing the decryption key; and decrypting the encrypted virtual hard disk drive file using the decryption key, wherein the decrypting decrypts the stored guest virtual machine state for execution of the guest virtual machine and decrypts the virtual secure cryptoprocessor state to provide the virtual secure cryptoprocessor for use by the guest virtual machine.

2. The method of claim 1, wherein the second partition remains hidden from the first partition during execution of the guest virtual machine, wherein the guest virtual machine is unable to view the second partition.

3. The method of claim 1, wherein the second guest is a privileged domain of the hypervisor.

4. The method of claim 1, wherein the virtual secure cryptoprocessor is available for use by an operating system of the guest virtual machine on boot of the guest virtual machine to provide assurance that the host computing environment and first guest are in trusted states for operating system execution.

5. The method of claim 4, wherein the operating system provides full disk encryption for the guest virtual machine based on the assurance provided by the virtual secure cryptoprocessor.

6. The method of claim 1, wherein the guest virtual machine reads the virtual secure cryptoprocessor state from the virtual hard disk drive file via a secure cryptoprocessor emulator that presents the virtual secure cryptoprocessor to the guest virtual machine as a physical device.

7. The method of claim 1, wherein the method further comprises repeating the providing a virtual secure cryptoprocessor for one or more other guest virtual machines of the hypervisor, wherein a respective different virtual secure cryptoprocessor is provided to each of the guest virtual machine and the one or more other guest virtual machines concurrently while the computer system executes the guest virtual machine and the one or more other guest virtual machines.

8. The method of claim 1, wherein the virtual secure cryptoprocessor comprises a virtual trusted platform module (vTPM).

9. A computer program product comprising:
a non-transitory computer readable storage medium storing instructions for execution to perform a method comprising:
providing a virtual secure cryptoprocessor for a guest virtual machine of a hypervisor of a computer system, the guest virtual machine being part of a first guest of the hypervisor, the providing the virtual secure cryptoprocessor comprising:
storing guest virtual machine state and virtual secure cryptoprocessor state together in an encrypted virtual hard disk drive file, wherein the virtual hard disk drive file comprises a first partition and a second partition, the second partition being separate and different from the first partition, wherein the first partition stores the guest virtual machine state including virtual machine data of the guest virtual machine, and the second partition stores the virtual secure cryptoprocessor state including data of the virtual secure cryptoprocessor;
storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state;
based on verifying that the host computing environment is in the trusted state and on booting the hypervisor on the host computing environment, unsealing the sealed partition of the second guest, the unsealing providing the decryption key; and
decrypting the encrypted virtual hard disk drive file using the decryption key, wherein the decrypting decrypts the stored guest virtual machine state for execution of the guest virtual machine and decrypts the virtual secure cryptoprocessor state to provide the virtual secure cryptoprocessor for use by the guest virtual machine.

10. The computer program product of claim 9, wherein the second partition remains hidden from the first partition during execution of the guest virtual machine, wherein the guest virtual machine is unable to view the second partition.

11. The computer program product of claim 9, wherein the virtual secure cryptoprocessor is available for use by an operating system of the guest virtual machine on boot of the guest virtual machine to provide assurance that the host computing environment and first guest are in trusted states for operating system execution.

12. The computer program product of claim 9, wherein the guest virtual machine reads the virtual secure cryptoprocessor state from the virtual hard disk drive file via a secure cryptoprocessor emulator that presents the virtual secure cryptoprocessor to the guest virtual machine as a physical device.

13. The computer program product of claim 9, wherein the method further comprises repeating the providing a virtual secure cryptoprocessor for one or more other guest virtual machines of the hypervisor, wherein a respective different virtual secure cryptoprocessor is provided to each of the guest virtual machine and the one or more other guest virtual machines concurrently while the computer system executes the guest virtual machine and the one or more other guest virtual machines.

14. A computer system comprising:
a memory; and
a processor in communication with the memory, wherein the computer system is configured to perform a method comprising:
providing a virtual secure cryptoprocessor for a guest virtual machine of a hypervisor of the computer system, the guest virtual machine being part of a first guest of the hypervisor, the providing the virtual secure cryptoprocessor comprising:
storing guest virtual machine state and virtual secure cryptoprocessor state together in an encrypted virtual hard disk drive file, wherein the virtual hard disk drive file comprises a first partition and a second partition, the second partition being separate and different from the first partition, wherein the first partition stores the guest virtual machine state including virtual machine data of the guest virtual machine, and the second partition stores the virtual secure cryptoprocessor state including data of the virtual secure cryptoprocessor;
storing a decryption key in a sealed partition of a second guest of the hypervisor, the sealed partition being sealed against a physical secure cryptoprocessor of the computer system, in which unsealing of the sealed partition and decryption key thereof is based on verifying, using the physical secure cryptoprocessor, that a host computing environment of the computer system is in a trusted state;
based on verifying that the host computing environment is in the trusted state and on booting the hypervisor on the host computing environment, unsealing the sealed partition of the second guest, the unsealing providing the decryption key; and
decrypting the encrypted virtual hard disk drive file using the decryption key, wherein the decrypting decrypts the stored guest virtual machine state for execution of the guest virtual machine and decrypts the virtual secure cryptoprocessor state to provide the virtual secure cryptoprocessor for use by the guest virtual machine.

15. The computer system of claim 14, wherein the second partition remains hidden from the first partition during execution of the guest virtual machine, wherein the guest virtual machine is unable to view the second partition.

16. The computer system of claim 14, wherein the guest virtual machine reads the virtual secure cryptoprocessor state from the virtual hard disk drive file via a secure cryptoprocessor emulator that presents the virtual secure cryptoprocessor to the guest virtual machine as a physical device.

17. The computer system of claim 14, wherein the method further comprises repeating the providing a virtual secure cryptoprocessor for one or more other guest virtual machines of the hypervisor, wherein a respective different virtual secure cryptoprocessor is provided to each of the guest virtual machine and the one or more other guest virtual machines concurrently while the computer system executes the guest virtual machine and the one or more other guest virtual machines.

* * * * *